(12) United States Patent
Anderson (10) Patent No.: US 8,347,563 B2
(45) Date of Patent: Jan. 8, 2013

(54) BOOM ASSEMBLY (76) Inventor: Ed Anderson, Salem, MO (US)

(*) Notice: Subject to any disclaimer, the term of this patent is extended or adjusted under 35 U.S.C. 154(b) by 0 days.

(21) Appl. No.: 13/447,900

(22) Filed: Apr. 16, 2012

(65) Prior Publication Data

US 2012/0210655 A1 Aug. 23, 2012

Related U.S. Application Data (63) Continuation of application No. 12/907,660, filed on Oct. 19, 2010, now Pat. No. 8,245,456.

(51) Int. Cl.
*B66C 23/00* (2006.01)

(52) U.S. Cl. ............... 52/118; 52/121; 52/632; 212/231; 212/264; 212/350

(58) Field of Classification Search ............ 52/118, 52/632, 117, 121; 212/350, 348, 347, 264, 212/230, 231, 269
See application file for complete search history.

(56) References Cited

U.S. PATENT DOCUMENTS

| 3,516,553 | A | * | 6/1970 | Reske | 212/350 |
| 3,587,886 | A | * | 6/1971 | Gano | 414/718 |
| 3,638,806 | A | * | 2/1972 | Hippach | 212/231 |
| 3,708,937 | A | * | 1/1973 | Sterner | 52/118 |
| 3,759,399 | A | * | 9/1973 | Glass et al. | 212/180 |
| 3,800,965 | A | * | 4/1974 | Barron et al. | 414/787 |
| 4,057,942 | A | * | 11/1977 | Kranefeld et al. | 52/115 |
| 4,257,201 | A | * | 3/1981 | Landolt et al. | 52/118 |
| 4,272,932 | A | * | 6/1981 | Wappler | 52/118 |
| 4,327,533 | A | * | 5/1982 | Sterner | 52/115 |
| 4,337,601 | A | * | 7/1982 | Vaerk et al. | 52/118 |
| 4,350,255 | A | * | 9/1982 | Blase et al. | 212/349 |
| 4,478,014 | A | * | 10/1984 | Poock et al. | 52/115 |
| 5,158,189 | A | * | 10/1992 | Watson et al. | 212/350 |
| 5,515,654 | A | * | 5/1996 | Anderson | 52/118 |
| 5,678,708 | A | * | 10/1997 | Forsberg et al. | 212/349 |
| 5,829,606 | A | * | 11/1998 | Erdmann | 212/350 |
| 6,086,256 | A | * | 7/2000 | Paschke et al. | 384/35 |

* cited by examiner

*Primary Examiner* — Robert Canfield
*Assistant Examiner* — Babajide Demuren
(74) *Attorney, Agent, or Firm* — Hovey Williams LLP

(57) ABSTRACT

A telescopic boom broadly comprises an elongated hollow outer boom, an elongated inner boom telescopically received within the outer boom, and a guidance structure for guiding the inner boom for telescopic movement is provided. The guidance structure includes a plurality of guide rails attached to the interior corners of the outer boom, a first roller assembly attached to one end of the inner boom, a second roller assembly attached to one end of the outer boom, and a mid roller assembly positioned proximal to the second roller assembly. The first roller assembly includes a plurality of wheels mounted on axles for engaging the guide rails. The second roller assembly includes roller bars positioned on opposed sides of one end of the outer boom for guiding the inner boom during telescopic movement. The mid roller assembly includes a third roller bar that engages guide rails positioned on the inner boom.

9 Claims, 7 Drawing Sheets

BOOM ASSEMBLY

RELATED APPLICATIONS

The present application is a continuation application of an earlier-filed U.S. non-provisional patent application titled BOOM ASSEMBLY, Ser. No. 12/907,660, filed Oct. 19, 2010. The present application claims priority benefit of the identified application, and hereby incorporates the identified application in its entirety by reference.

BACKGROUND OF THE INVENTION

1. Field of the Invention

Embodiments of the present invention relate to telescopic boom devices. More particularly, embodiments of the present invention relate to assemblies for guiding the boom during telescopic movement.

2. Description of the Related Art

Telescopic boom devices are commonly used in applications requiring rapid extension and retraction of a working tool. For example, telescopic booms are commonly used in underground mining operations for working on the ceiling or upper surface of the mine. These telescopic booms may be provided with scaling tools which knock down loose deposits from the ceiling of the mine to stabilize the mine before workers are allowed to enter.

The telescopic booms often include an inner boom and a surrounding outer boom, such that the inner boom may retract and extend within the outer boom. One such implementation of the boom may include upper and lower rollers affixed to the free end of the outer boom that engage the upper and lower exterior corners of the inner boom. In addition, there may be upper and lower rollers affixed to one end of the inner boom that engage the upper and lower interior corners of the outer boom. During extension of the inner boom, particularly at its greatest extent, the load at the tooling end of the boom may exert a compressive force between the upper rollers on the inner boom and the upper interior corners of the outer boom. Such a pressure on the rollers may cause them to fail, leading to frequent equipment repair and delays in operations.

SUMMARY OF THE INVENTION

Embodiments of the present invention solve the above-mentioned problems and provide a distinct advance in the art of telescopic boom devices. More particularly, embodiments of the invention provide an assembly that couples to an outer boom that reduces the pressure exerted on roller wheels attached to an inner boom.

Various embodiments of the present invention include a roller assembly for use with a telescopic boom apparatus including an extensible inner boom and an outer boom, wherein the roller assembly broadly comprises a housing, a forward stabilizer, a rear stabilizer, and a roller bar. The housing may couple to the outer boom and may include a first side wall, a second side wall, a forward wall, and a rear wall. The forward wall and the rear wall both may include a generally rectangular opening with a recess in each corner that allows a first set of guide rails that are secured to the outer boom to pass therethrough. The outer surfaces of the forward wall and the rear wall may be configured to contact edges of an outer boom upper wall, an outer boom first side wall, and an outer boom second side wall created by a break along the length of each wall.

The forward stabilizer and the rear stabilizer both may include a stabilizer upper wall, a stabilizer first side wall, and a stabilizer second side wall. The stabilizer upper wall may be angled downward from the forward wall and configured to contact the outer boom upper wall. The stabilizer first side wall and the stabilizer second side wall may be coupled to the edges of the stabilizer upper wall, angled inward therefrom, and configured to contact an upper portion of the first set of guide rails.

The roller bar may be coupled to the first side wall and the second side wall, and may be configured to engage an upper portion of a second set of guide rails that are secured to the inner boom in order to relieve the pressure exerted on roller wheels attached to the inner boom when the inner boom is under load.

Other embodiments of the present invention include a telescopic boom apparatus broadly comprising an elongated hollow outer boom, an elongated inner boom telescopically received within the outer boom, and a guidance system.

The outer boom may include opposed proximal and distal ends and a hollow passageway extending therebetween. The distal end generally presents a cross-sectional width. The inner boom is capable of axial movement in and out of the distal end of the outer boom and also may include opposed proximal and distal ends.

The guidance structure may include a first set of elongated guide rails, a plurality of roller wheels, a second set of elongated guide rails, a pair of roller bars, and a roller assembly. The first set of guide rails may be secured within the outer boom passageway and may extend parallel to the longitudinal axis of the outer boom. Each of the first set guide rails may include an arcuate track surface. The roller wheels may be spaced circumferentially about the proximal end of the inner boom. Each of the roller wheels may include an arcuate rail engaging surface for engaging the track surfaces of the first set of guide rails during telescoping movement of the inner boom. The second set of guide rails may be secured to the inner boom. The roller bars may be secured to the distal end of the outer boom for engaging the second set of guide rails for guiding the inner boom during axial telescoping movement in and out of the distal end of the outer boom. The roller bars may be positioned on opposed sides of the distal end of the outer boom and extend across substantially the entire cross sectional width of the distal end of the outer boom.

The roller assembly may include a housing, a forward stabilizer, a rear stabilizer, and a roller bar. The housing may couple to the outer boom and may include a first side wall, a second side wall, a forward wall, and a rear wall. The forward wall and the rear wall both may include a generally rectangular opening with a recess in each corner that allows a first set of guide rails that are secured to the outer boom to pass therethrough. The outer surfaces of the forward wall and the rear wall may be configured to contact edges of an outer boom upper wall, an outer boom first side wall, and an outer boom second side wall created by a break along the length of each wall.

The forward stabilizer and the rear stabilizer both may include a stabilizer upper wall, a stabilizer first side wall, and a stabilizer second side wall. The stabilizer upper wall may be angled downward from the forward wall and configured to contact the outer boom upper wall. The stabilizer first side wall and the stabilizer second side wall may be coupled to the edges of the stabilizer upper wall, angled inward therefrom, and configured to contact an upper portion of the first set of guide rails.

The roller bar may be coupled to the first side wall and the second side wall, and may be configured to engage an upper portion of a second set of guide rails that are secured to the inner boom in order to relieve the pressure exerted on roller wheels attached to the inner boom when the inner boom is under load.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
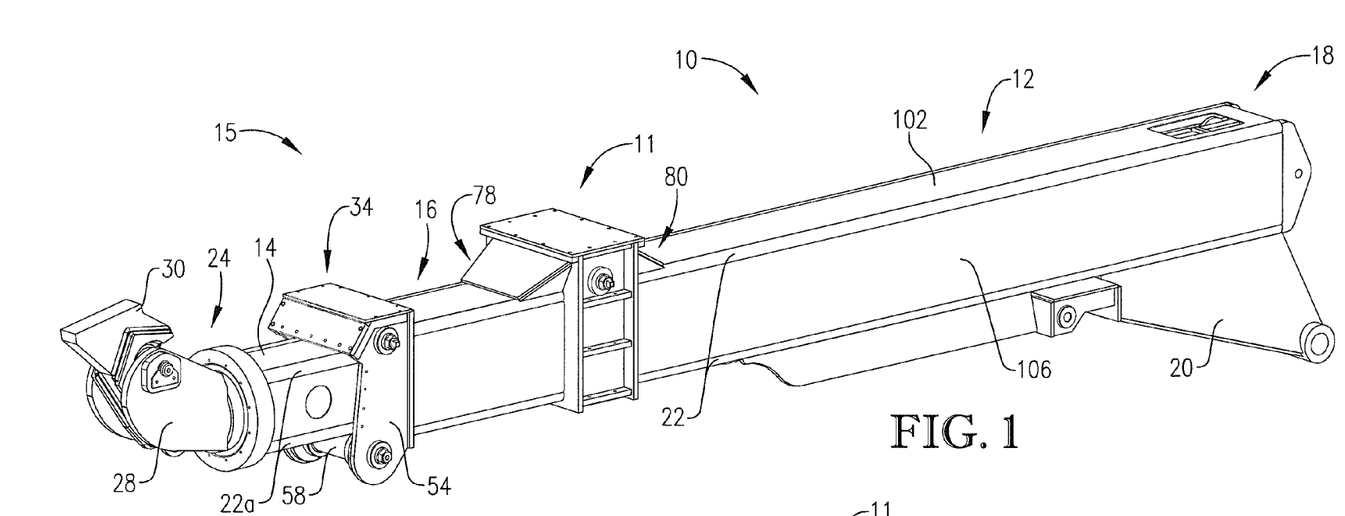
FIG. 1 is a perspective view of a telescopic boom apparatus comprising an outer boom, an inner boom, and a mid roller assembly constructed in accordance with various embodiments of the present invention.

A telescopic boom apparatus 10 that includes a mid roller assembly 11 constructed in accordance with various embodiments of the present invention is shown in FIG. 1. The boom apparatus 10 is similar in many respects to the boom apparatus described in U.S. Pat. No. 5,515,654, issued May 14, 1996, and incorporated by reference herein in its entirety.

The boom apparatus 10 broadly includes an elongated hollow outer boom 12, an elongated inner boom 14 telescopically received within the outer boom 12, and a guidance structure 15 for guiding the inner boom 14 for telescoping movement in and out of the outer boom 12.

In more detail, the outer boom 12 is formed of tubular steel and presents a rectangular cross section. The outer boom 12 has opposed axial distal and proximal ends 16 and 18 and a hollow passageway extending therebetween. Attachment plates 20 are secured to the proximal end 18 of the outer boom 12 for coupling the outer boom 12 to a truck or a tractor. As those skilled in the art will appreciate, the truck or tractor is provided with conventional hydraulic cylinders or gear devices for telescopically extending or retracting the inner boom 14 relative to the outer boom 12.

Figure 2:
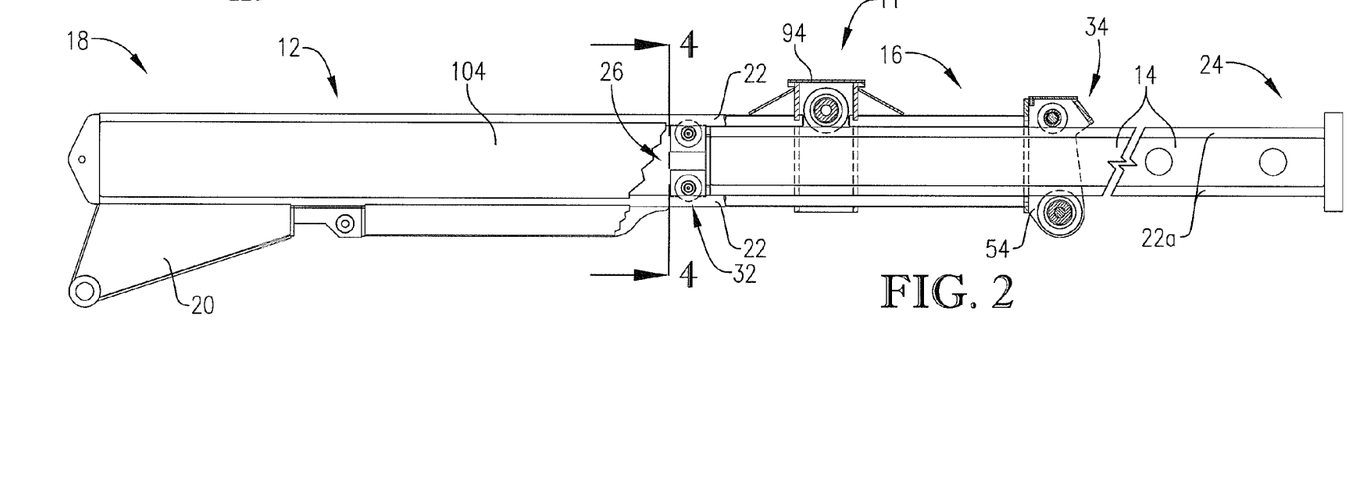
FIG. 2 is a side view of the boom apparatus with the inner boom extended and a portion of the outer boom cut away to display a first roller assembly, a second roller assembly, and a third roller.
Figure 3:
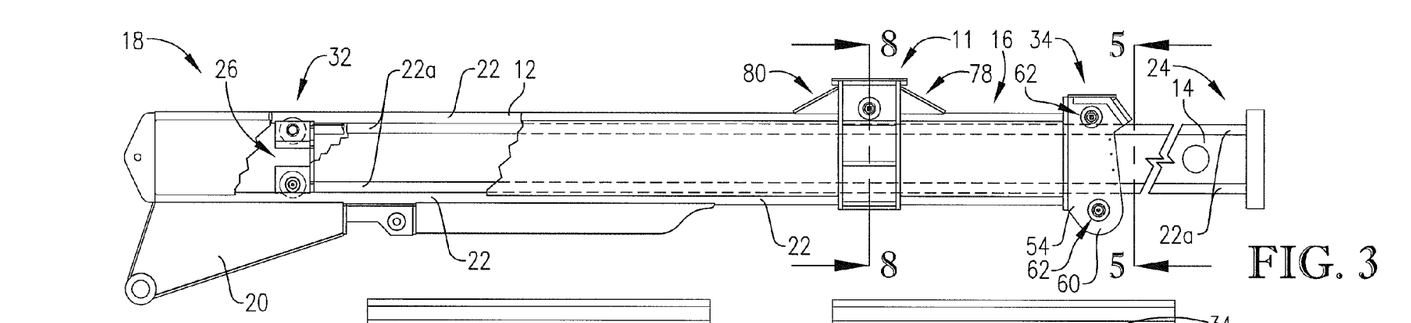
FIG. 3 is a side view of the boom apparatus with the inner boom retracted and a portion of the outer boom cut away similar to FIG. 2.

The inner boom 14 is telescopically received within the outer boom 12 and is configured for axial telescopic movement about the longitudinal axis of the outer boom 12 (see FIGS. 1-3). The inner boom 14 is formed of tubular steel and presents a rectangular cross section. The inner boom 14 has axially opposed distal and proximal ends 24 and 26. The distal end 24 has walls defining an opening for receiving a conventional tool barrel 28. The tool barrel 28 has structure for coupling with any suitable tool such as a scaling tool 30 or a scraper for dislodging loose rock deposits from the ceiling of a mine. As those skilled in the art will appreciate, the proximal end 26 of the inner boom 14 is coupled to a hydraulic cylinder or gear device on the truck or tractor for telescopically extending or retracting the inner boom 14 relative to the outer boom 12.

The guidance structure 15 is provided for telescopically guiding the inner boom 14 in and out of the outer boom 12. As best illustrated in FIGS. 2-5, the guidance structure 15 broadly includes a first set of guide rails 22 attached to the interior corners of the outer boom 12, a second set of guide rails 22a secured to the inner boom 14, a first roller assembly 32 attached to the proximal end 26 of the inner boom 14 for engaging the guide rails 22, a second roller assembly 34 attached to the distal end 16 of the outer boom 12 for engaging the guide rails 22a during telescopic movement, and the mid roller assembly 11 described below.

The elongated guide rails 22 are attached to the interior corners of the outer boom 12 and extend the entire longitudinal length of the outer boom 12. The guide rails 22 are formed of elongated steel rods and each presents an arcuate wheel-engaging portion having a specific radius of curvature. In exemplary embodiments, the wheel-engaging portions of the guide rails 22 present a radius of approximately 1.25".

Figure 4:
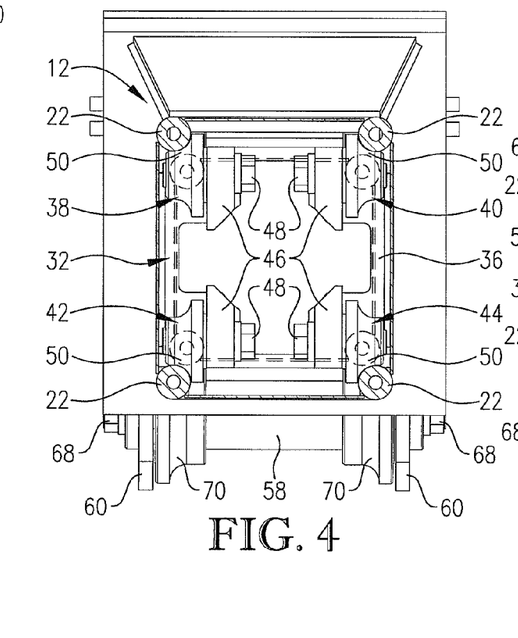
FIG. 4 is a sectional view of the boom apparatus taken along the line 4-4 of FIG. 2, looking from a proximal end toward a distal end of the boom.
Figure 6:
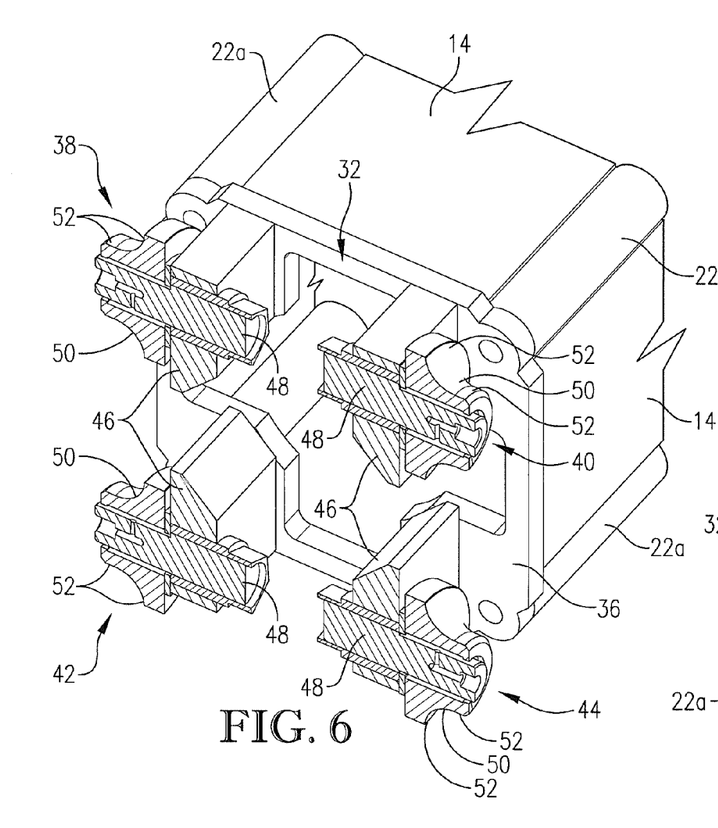
FIG. 6 is a perspective view of the proximal end of the inner boom showing a sectional view of the first roller assembly.
Figure 7:
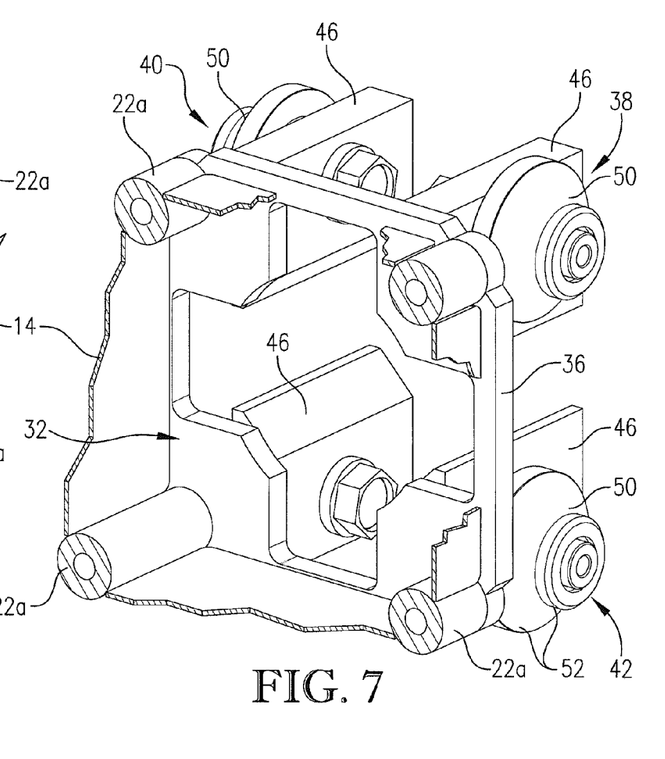
FIG. 7 is a perspective view of the proximal end of the inner boom showing a cut away view of a second set of guide rails.

The first roller assembly 32 is attached to the proximal end 26 of the inner boom 14 and is configured for engaging the guide rails 22 attached to the outer boom 12. As illustrated in FIGS. 4 and 6-7, the first roller assembly 32 includes a support frame 36 and a plurality of wheels 38, 40, 42 and 44 rotatably mounted to the support frame 36. The support frame 36 is welded or bolted to the proximal end 26 of the inner boom 14 and is formed of steel. The support frame 36 presents a rectangular cross section having approximately the same dimensions as the cross section of the inner boom 14. The support frame 36 includes four post members 46 extending parallel to the longitudinal axis of the inner boom 14. Each post member 46 includes a slot therein for coupling with the wheels 38, 40, 42 and 44 as described below.

The wheels 38, 40, 42 and 44 are configured for engaging the guide rails 22 positioned in the outer boom 12. The wheels 38, 40, 42 and 44 are rotatably mounted on axles 48 extending through the slots of the post members 46. Each of the wheels 38, 40, 42 and 44 includes an arcuate rail-engaging portion 50 for engaging the corresponding wheel-engaging portions of guide rails 22. The arcuate rail-engaging portion 50 presents a radius of curvature approximately equal to the radius of curvature of the arcuate wheel-engaging portions of the guide rails 22.

The rail-engaging portions 50 of the wheels 38, 40, 42 and 44 present an exemplary radius of curvature of approximately 1.25" which is identical to the radius of curvature of the guide rails 22. With this configuration, the arcuate rail-engaging portions 50 of the wheels 38, 40, 42 and 44 engage a full quadrant of the surface area of the guide rails 22. Thus, the wheels 38, 40, 42 and 44 securely engage the guide rails 22 during axial telescopic movement of the inner boom 14.

As best illustrated in FIGS. 6 and 7, each of the wheels 38, 40, 42 and 44 also includes a pair of generally annular lip portions 52 extending tangentially from each end of the arcuate rail-engaging portions 50. The lip portions 52 envelop a portion of the guide rails 22 for maintaining the engagement between the wheels 38, 40, 42 and 44 and the guide rails 22.

In various embodiments, the two uppermost wheels 38 and 40 of the first roller assembly 32 are mounted on axles 48 having eccentric axes. The axis of the eccentric axle 48 is slightly displaced from the geometric center of the axle 48. When the eccentric axle 48 is rotated, the position of the arcuate rail-engaging portion 50 is shifted relative to the arcuate wheel-engaging portions of the guide rails 22. This allows the uppermost wheels 38 and 40 of the first roller assembly 32 to be adjusted to properly align the guidance structure 15. For example, if the rail-engaging portions 50 of the uppermost wheels 38 and 40 do not securely engage the wheel-engaging portions of the guide rails 22, the eccentric axles 48 of the two uppermost wheels 38 and 40 can be rotated to reposition the uppermost wheels 38 and 40 closer to the guide rails 22. Alternatively, if the uppermost wheels 38 and 40 are spaced too far apart from the lowermost wheels 42 and 44 to fit within the guide rails 22, the axles 48 of the two uppermost wheels 38 and 40 can be rotated the opposite direction to reposition the uppermost wheels 38 and 40.

In various embodiments, the wheels 38, 40, 42 and 44 are not attached to the axles 48 with fasteners or bolts, but are freely mounted thereto. Once the wheels 38, 40, 42 and 44 engage the guide rails, they are secured to the axles 48 by the guide rails 22. With this configuration, the wheels can be easily replaced and/or repaired by disengaging them from the guide rails 22 and simply removing them from the axles 48.

Figure 5:
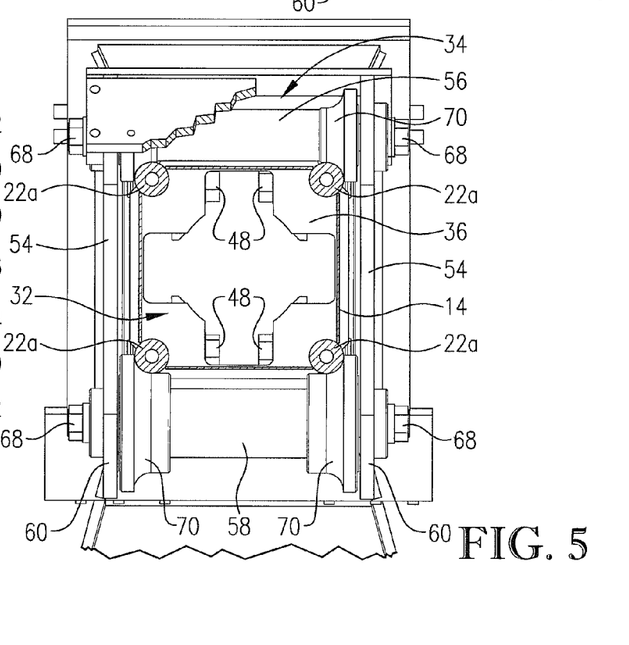
FIG. 5 is a sectional view of the boom apparatus taken along the line 5-5 of FIG. 3, looking from the distal end toward the proximal end of the boom.

As best illustrated in FIG. 5, the second roller assembly 34 includes a support frame 54 attached to the distal end 16 of the outer boom 12 and pair of roller bars 56 and 58 rotatably mounted thereto. The roller bars 56 and 58 are configured for engaging the outer surface of the inner boom 14 during telescopic movement. As seen in FIG. 5, the roller bars 56 and 58 engage guide rails 22a secured to or integrally formed with the outer surface of the inner boom 14.

The support frame 54 includes a pair of elongated steel plates 60 extending vertically relative to the longitudinal axis of the outer boom 12. The steel plates 60 are attached to opposed sides of the distal end 16 of the outer boom 12 and include a plurality of slots 62 therein.

Figure 9:
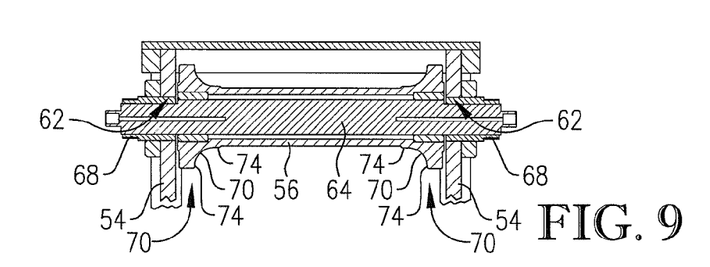
FIG. 9 is a sectional view of an upper roller of the second roller assembly.
Figure 10:
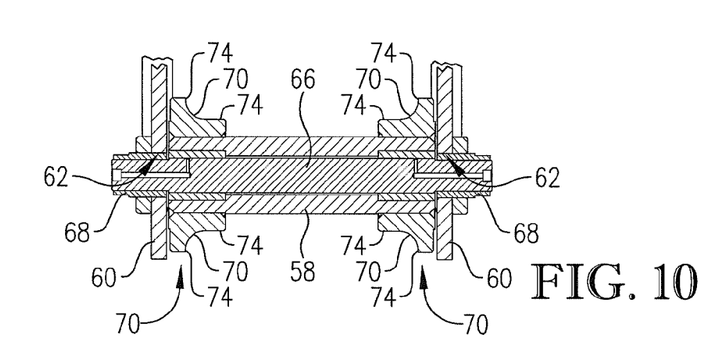
FIG. 10 is a sectional view of a lower roller of the second roller assembly.

As best illustrated in FIGS. 9 and 10, the roller bars 56 and 58 are rotatably mounted on a pair of shafts 64 and 66 extending through the slots 62 in the steel plates 60. A pair of conventional locking fasteners 68, such as the trantorque device manufactured by Fenner Manheim, are fastened to the ends of the shafts 64 and 66 for retaining the roller bars 56 and 58 on the shafts 64 and 66.

Each roller bar 56 and 58 includes a pair of axially opposed flange members 70 positioned on the ends of each of the shafts 64 and 66 for engaging the corners of the inner boom 14. Each of the flanges 70 includes an arcuate portion 72 for engaging the outside corners of the inner boom 14. The flanges 70 also include a generally annular lip portion 74 extending tangentially from the arcuate portion 72 for maintaining the engagement between the flange members 70 and the outside corners of the inner boom 14.

In various embodiments, the uppermost roller bar 56 is rotatably mounted about a shaft having an eccentric axis. The axis of the eccentric shaft 64 is slightly displaced from the geometric center of the shaft 64. With this configuration, the uppermost roller bar 56 can be repositioned about a vertical axis relative to the inner boom 14 by rotating the eccentric shaft 64.

Figure 8:
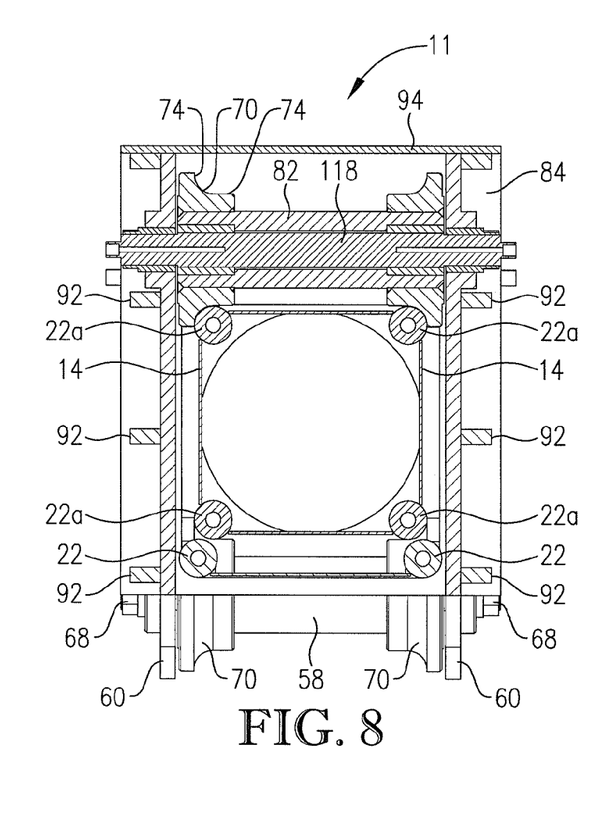
FIG. 8 is a sectional view of the boom apparatus taken along the line 5-5 of FIG. 3, looking from the proximal end toward the distal end of the boom.
Figure 11:
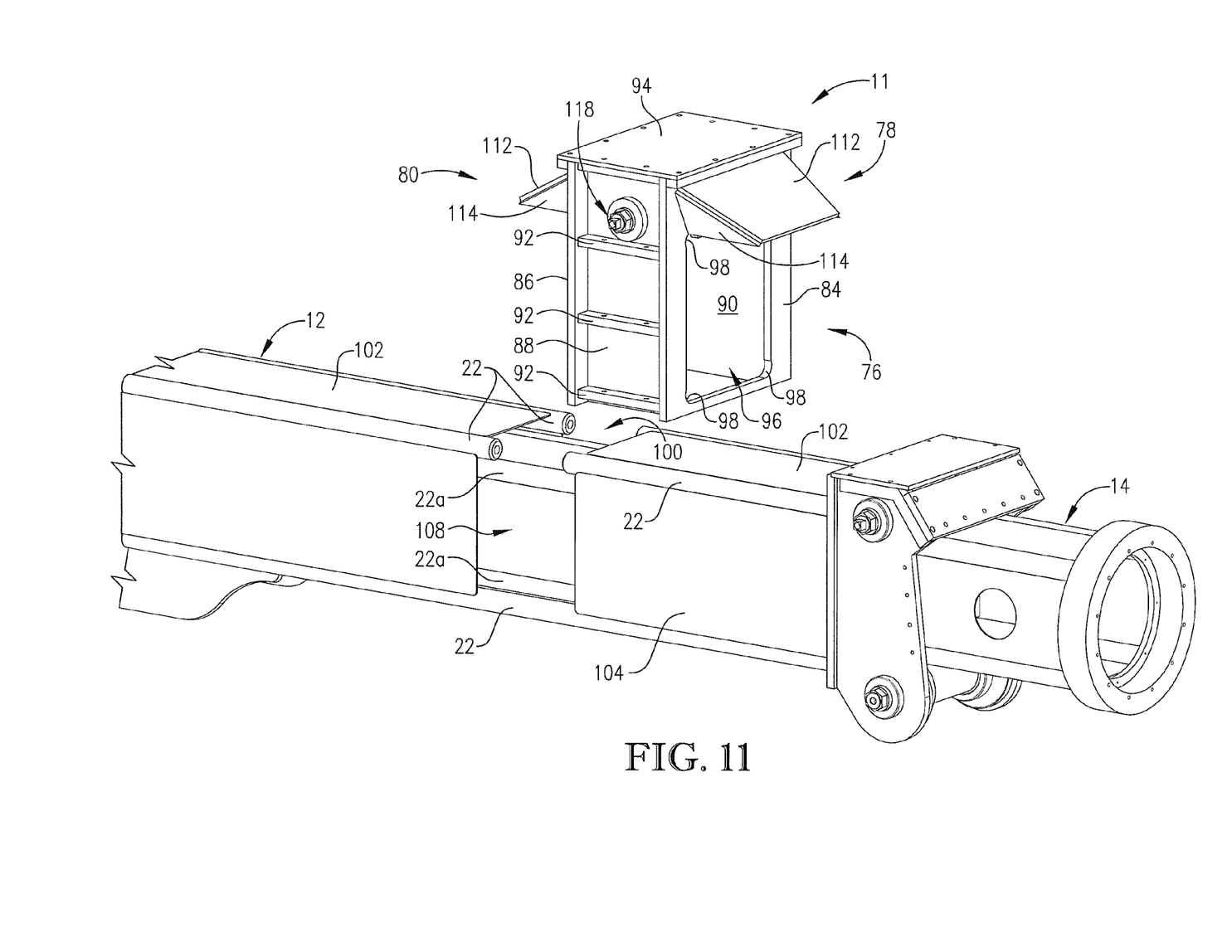
FIG. 11 is a perspective view of a portion of the boom apparatus with the mid roller assembly isolated from the outer boom.
Figure 12:
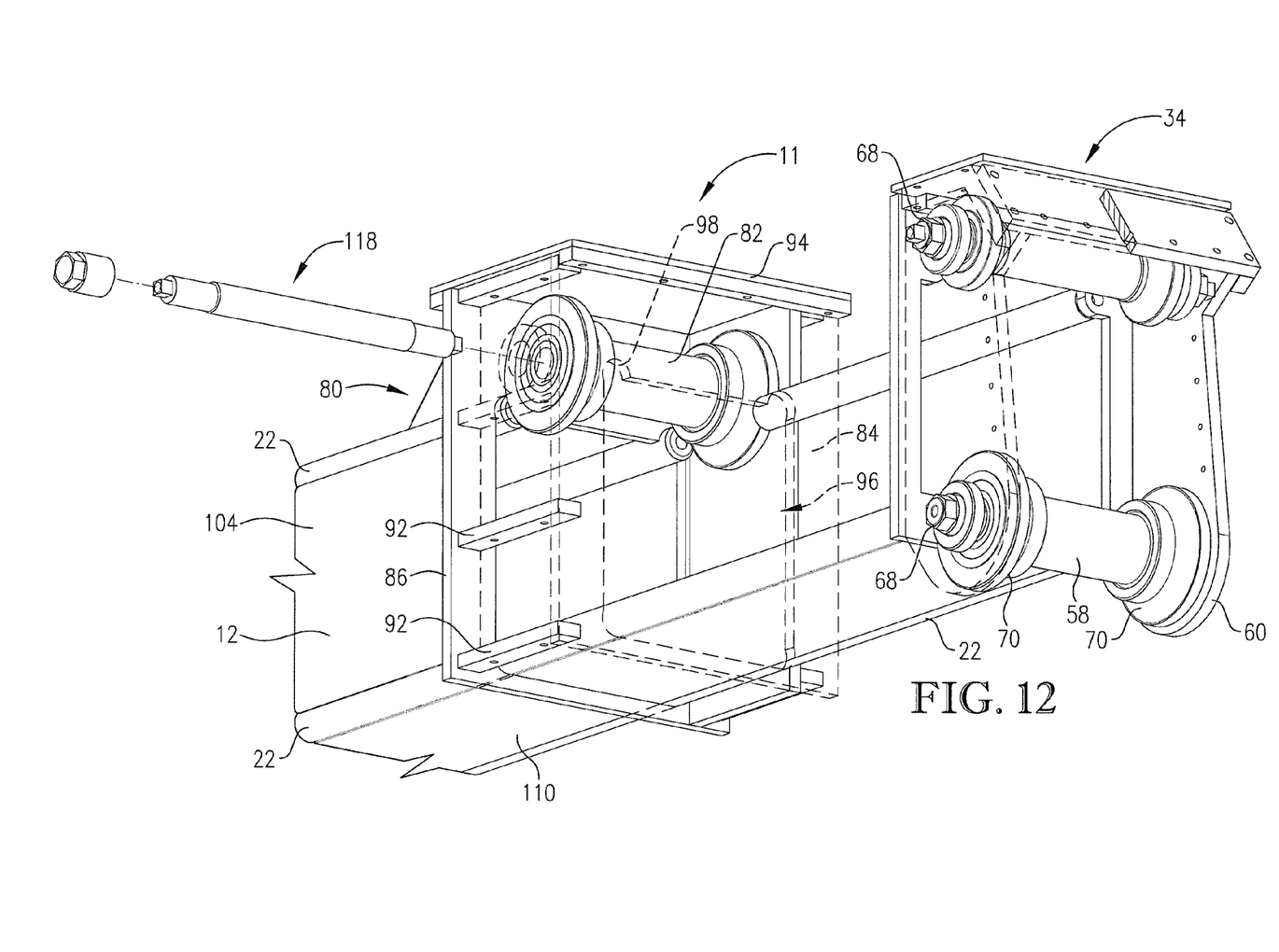
FIG. 12 is a perspective view of the outer boom, with portions of the outer boom removed and portions of the second roller assembly and the mid roller assembly hidden to display a first set of guide rails.
Figure 13:
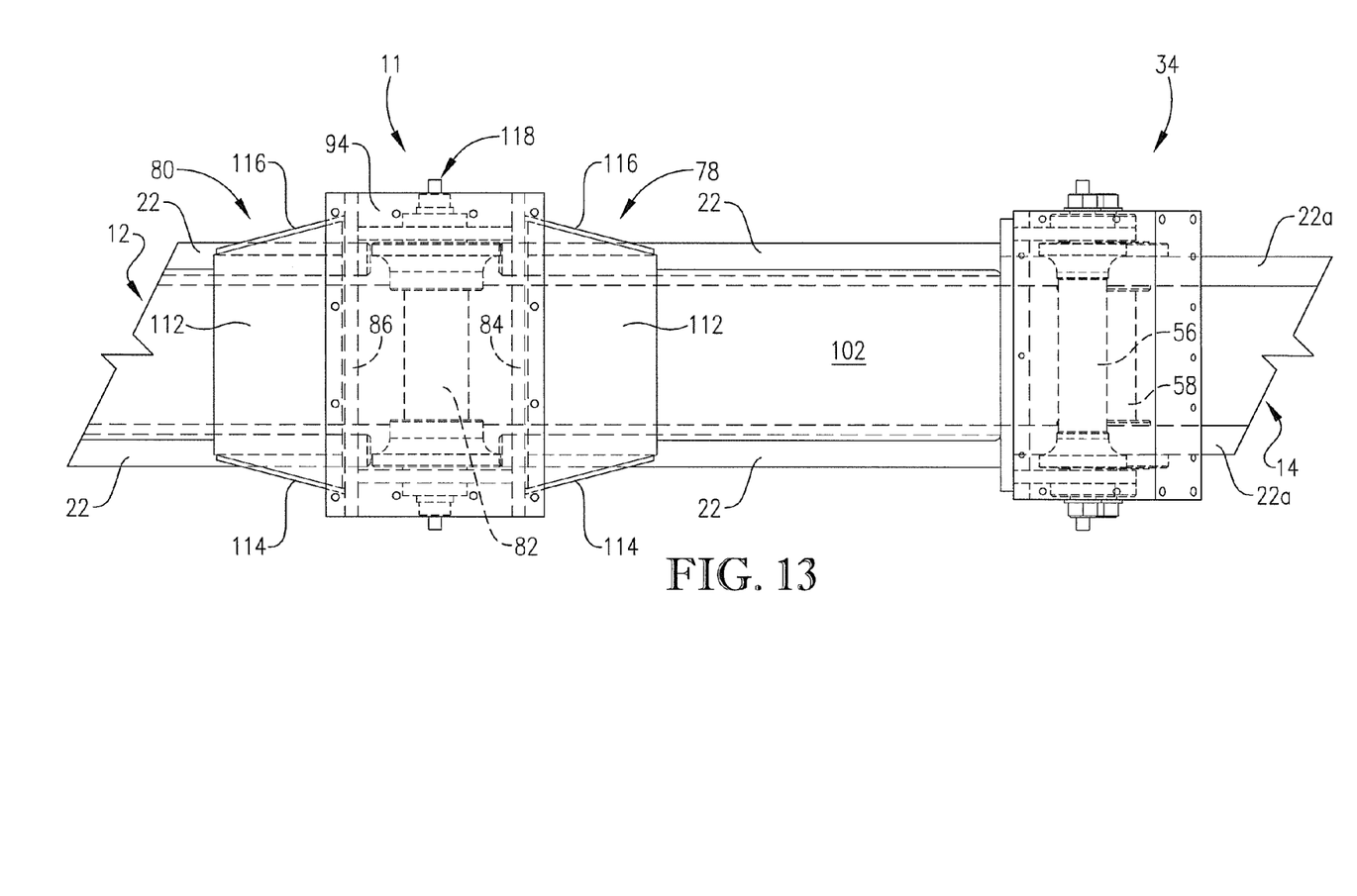
FIG. 13 is a top view of a portion of the boom apparatus with interior components shown in dashed line.

The mid roller assembly 11, best seen in FIG. 11 and also shown in FIGS. 8 and 12-13, comprises a housing 76, a forward stabilizer 78, a rear stabilizer 80, and a third roller bar 82. The mid roller assembly 11 is generally positioned along the outer boom 12 a distance from the second roller assembly 34 and in the direction of the proximal end 26 of the inner boom 14.

The housing 76 may include a forward wall 84, a rear wall 86, a housing first side wall 88, a housing second side wall 90, a plurality of gussets 92, and a cover plate 94. The forward wall 84 and the rear wall 86 are spaced apart from one another with the housing first side wall 88 and the housing second side wall 90, also spaced apart, positioned orthogonally therebetween. The forward wall 84 may be positioned toward the distal end 24 of the inner boom 14, and the rear wall 86 may be positioned toward the proximal end 26.

The forward wall 84 and the rear wall 86 may be substantially similar to one another, and both may include a generally rectangular boom opening 96, whose inner perimeter is shaped to match the cross-sectional shape of the outer boom 12. The corners of each boom opening 96 may include an arcuate rail-engaging recess 98 that contact the outer perimeter of the guide rails 22 of the outer boom 12. Between the forward wall 84 and the rear wall 86, the upper guide rails 22 may have a rail separation or rail break 100, seen in FIGS. 11 and 13, along their length to accommodate the third roller bar 82. In addition, outer boom upper wall 102, outer boom first side wall 104, and outer boom second side wall 106 each include a wall break 108 along their length, seen in FIGS. 11-13. The edges of the outer boom upper wall 102, the outer boom first side wall 104, and the outer boom second side wall 106 created by the wall break 108 contact the outer surfaces of the forward wall 84 and the rear wall 86 of the housing 76. An outer boom lower wall 110 generally does not include a break, and the perimeter of the boom opening 96 of the forward wall 84 and the rear wall 86 contacts the outer surface of the outer boom lower wall 110. The boom opening 96 may be further positioned such that the inner boom 14 passes through the boom opening 96 of both the forward wall 84 and the rear wall 86 of the housing 76.

The housing first side wall 88 and the housing second side wall 90 may be positioned inward from the edges of the forward wall 84 and the rear wall 86. The gussets 92 may be positioned extending lengthwise between the forward wall 84 and the rear wall 86 in the space between the housing first and second side walls 88, 90 and the edges of the forward wall 84 and the rear wall 86. The gussets 92 may also be evenly spaced along the length of the housing first and second side walls 88, 90 and generally add structural strength between the forward wall 84 and the rear wall 86.

The cover plate 94 may be positioned on the upper edges of the forward wall 84 and the rear wall 86, and may be aligned with or parallel to the outer boom upper wall 102. The cover plate 94 offers a top cover to the mid roller assembly 11 and may be removed to access the third roller bar 82.

The forward stabilizer 78 and the rear stabilizer 80 are substantially similar to one another and both include a stabilizer upper wall 112, a stabilizer first side wall 114, and a stabilizer second side wall 116. The forward stabilizer 78 extends outward from the outer surface of the forward wall 84, and the rear stabilizer 80 extends outward from the outer surface of the rear wall 86. The forward stabilizer upper wall 112 may be positioned at a downward angle from the forward wall 84 and may contact the outer boom upper wall 102. The top edge of the forward stabilizer upper wall 112 may be wider than the width of the outer boom upper wall 102. The forward stabilizer first side wall 114 and the forward stabilizer second side wall 116 may couple to the side edges of the forward stabilizer upper wall 112 and extend inward to contact the top surface of the upper guide rails 22. The upper wall 112, the first side wall 114, and the second side wall 116 of the rear stabilizer 80 may have the same configuration as the forward stabilizer 78 with respect to the rear wall 86 and the outer boom upper wall 102, as shown in FIG. 13. The forward stabilizer 78 and the rear stabilizer 80 generally stabilize the mid roller assembly 11 as the inner boom 14 extends and retracts within the outer boom 12.

The third roller bar 82 may be substantially similar to the uppermost roller bar 56 and may include the axially-opposed flange members 70 with arcuate portions 72 and annular lip portion 74, as shown in FIG. 8. The third roller bar 82 may further be mounted on an eccentric mid roller shaft 118 that is substantially similar to eccentric shaft 66. The ends of the mid roller shaft 118 may be coupled to the housing first side wall 88 and the housing second side wall 90 using the fasteners 68. As shown in FIG. 8, the flange members 70 of the third roller bar 82 may engage the upper set of the second guide rails 22a in the same fashion as the flanges 70 on upper roller bar 56. The third roller bar 82 rotates as the inner boom 14 moves in and out. In addition, the height of the third roller bar 82 with respect to the inner boom 14 may be adjusted by rotating the eccentric mid roller shaft 118 in a similar fashion to the shaft 66.

In operation, the guidance structure 15 of the above described boom apparatus 10 effectively maintains the telescopic engagement between the inner boom 14 and the outer boom 12 during axial telescopic movement. The boom apparatus 10 is shown in FIG. 2 with the inner boom 14 extended, and in FIG. 3 with the inner boom 14 retracted. The wheels 38, 40, 42 and 44 of the first roller assembly 32 engage the guide rails 22 for guiding the proximal end 26 of the inner boom 14 along the axial length of the outer boom 12. The roller bars 56 and 58 of the second roller assembly 34 as well as the third roller bar 82 engage the outer surface of the distal end 24 of the inner boom 14 for guiding the inner boom 14 in and out of the outer boom 12. The third roller bar 82 provides relief of the pressure exerted on the upper wheels 38, 40 when the tool 30 is engaged and the distal end 24 of the inner boom 14 has a load on it.

If the guidance structure 15 of the boom apparatus 10 must be adjusted during operation, the uppermost wheels 38 and 40 of the first roller assembly 32 and the uppermost roller bar 56 of the second roller assembly 34 can be rotated about their eccentric axes to reposition the guidance structure 15 relative to the outer and inner booms 12, 14.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A roller assembly for use with a telescopic boom apparatus including an extensible inner boom and an outer boom, the roller assembly comprising:
    a housing coupled to the outer boom, the housing located along a length of the outer boom at a distance from a distal end of the outer boom; and
    a roller bar coupled to a first side wall and a second side wall of the housing, the roller bar configured to engage an upper portion of a set of guide rails that are secured to the inner boom and to relieve the pressure exerted on roller wheels attached to the inner boom when the inner boom is under load.

2. The roller assembly of claim 1, wherein the housing further includes a forward wall and a rear wall, wherein the forward wall and the rear wall both include a generally rectangular opening.

3. The roller assembly of claim 2, further including a forward stabilizer coupled to the forward wall and a rear stabilizer coupled to the rear wall, wherein the forward stabilizer and the rear stabilizer are both configured to couple to an outer boom upper wall.

4. The roller assembly of claim 3, wherein the forward stabilizer and the rear stabilizer both include a stabilizer upper wall, a stabilizer first side wall, and a stabilizer second side wall, the stabilizer upper walls being angled downward from the housing and configured to couple to the housing and to the outer boom upper wall, the stabilizer first side walls and the stabilizer second side walls coupled to the stabilizer upper walls and to the upper boom.

5. The roller assembly of claim 2, wherein outer surfaces of the forward wall and the rear wall are configured to contact edges of an outer boom upper wall, an outer boom first side wall, and an outer boom second side wall created by a break along the length of each wall.

6. The roller assembly of claim 2, wherein the opening of the forward wall and the rear wall are configured to allow an outer boom lower wall to pass therethrough continuously.

7. The roller assembly of claim 2, wherein the housing further includes a plurality of gussets, each gusset extending longitudinally between the forward wall and the rear wall, the gussets being positioned adjacent to the first side wall and the second side wall inward from outer edges of the forward wall and the rear wall.

8. The roller assembly of claim 2, wherein the housing further includes a cover plate removably coupled to the forward wall, the rear wall, the first side wall, and the second side wall, the cover plate being removable to access the roller bar.

9. The roller assembly of claim 2, further including an eccentric shaft coupled to the first side wall and the second side wall and on which the roller bar is mounted, the eccentric shaft being rotatable to adjust the height of the roller bar with respect to the inner boom.

* * * * *